June 30, 1970     R. D. WICHMAN     3,518,445

AUTOMATIC STARTING CONTROL FOR ENGINE-GENERATOR

Filed Aug. 7, 1967     2 Sheets-Sheet 1

TO LOAD

INVENTOR.
RALPH D. WICHMAN

BY

Lothrop & West
ATTORNEYS

United States Patent Office 3,518,445
Patented June 30, 1970

3,518,445
AUTOMATIC STARTING CONTROL FOR ENGINE-GENERATOR
Ralph D. Wichman, 2554 Taft St.,
Sacramento, Calif. 95815
Filed Aug. 7, 1967, Ser. No. 658,886
Int. Cl. F02n *11/08*
U.S. Cl. 290—30  5 Claims

ABSTRACT OF THE DISCLOSURE

Imposing a predetermined electrical load on the power circuit activates a first relay which serves concurrently to open a magneto-to-ground connection and actuate the cranking solenoid so as to start an internal combustion engine driving an alternator. As full voltage is attained, a time delay relay comes into operation, deactivating the cranking solenoid opening the starting current circuit and closing the magneto-to-ground circuit. Within milliseconds thereafter a transformer-connected circuit, including a rectifier and voltage regulator, actuates a third relay effective to open the magneto-to-ground connection, thereby allowing the engine and alternator to continue at full output. Removing the load closes the magneto-to-ground circuit and stops the engine.

---

The invention relates to improvements in electrical control systems for engine driven alternators, and more particularly to starting controls for small, portable power plants.

While the market place, as well as the patent literature, is replete with control systems which automatically start a prime mover used to drive an electrical alternator or generator, many of these devices have been cumbersome and heavy. While these characteristics are not of undue importance in stationary installations, they become especially undesirable in portable plants such as might be used in small boats and on camping and fishing or other trips.

The latter years have witnessed a remarkable increase in the use of small boats, vehicle trailers, campers and the like. In most instances, it is desirable that the equipment with which these mobile units are provided, such as electric lights, radios, coolers and television sets, be powered by a small engine-generator set located in the unit.

Space within these mobile units is at a premium and the engine-generator sets heretofore used have occupied an undue amount.

It is therefore an object of the invention to provide an automatic starting control for an engine-generator set which is very compact in size and is relatively light in weight.

It is another object of the invention to provide a starter control which is arranged in a small but sturdy housing requiring only that the necessary connecting wires be attached to the engine-generator set and a storage battery.

It is still another object of the invention to provide a starter control unit which is relatively economical, yet is reliable, resistant to vibration, long-lived and stable and quiet in operation.

It is a further object of the invention to provide a starter control unit which has but few parts which can get out of order and which, if necessary, can readily be repaired.

It is another object of the invention to provide a generally improved starter control unit.

Figure 1:
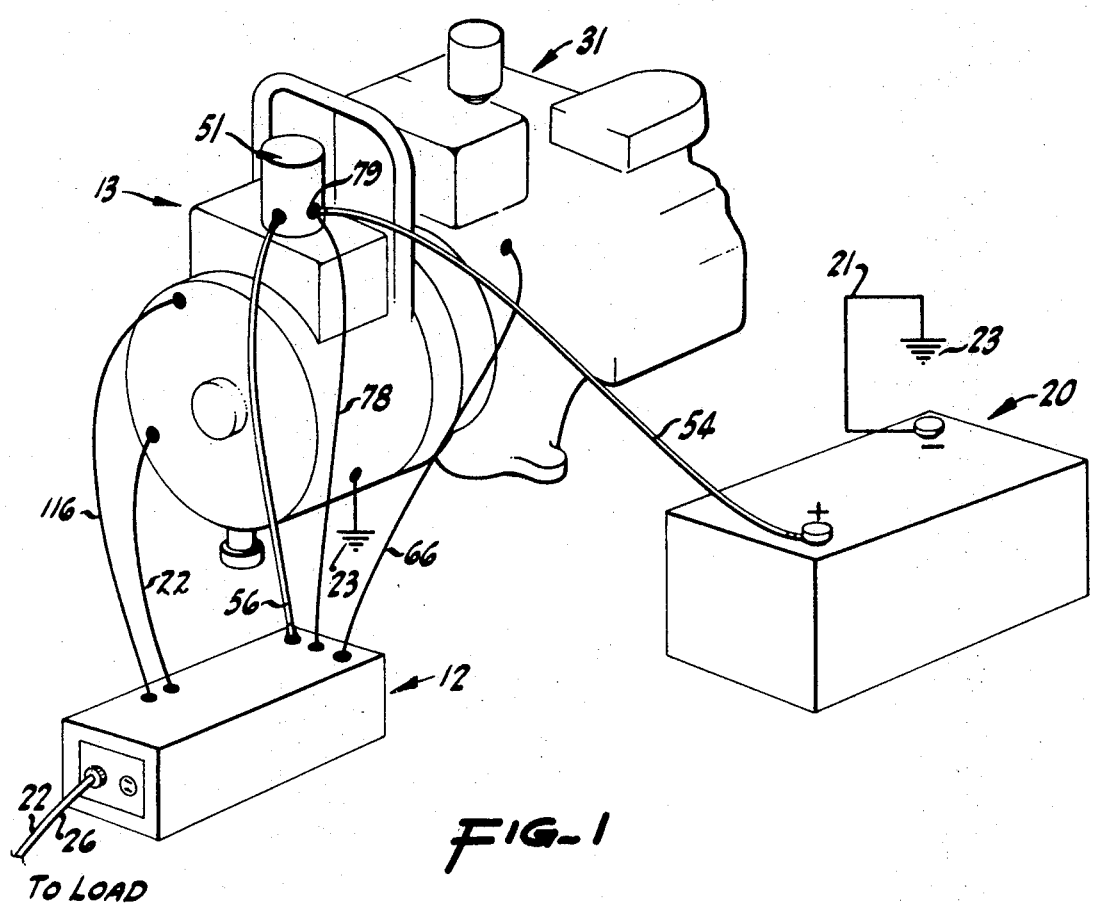
Figure 2:
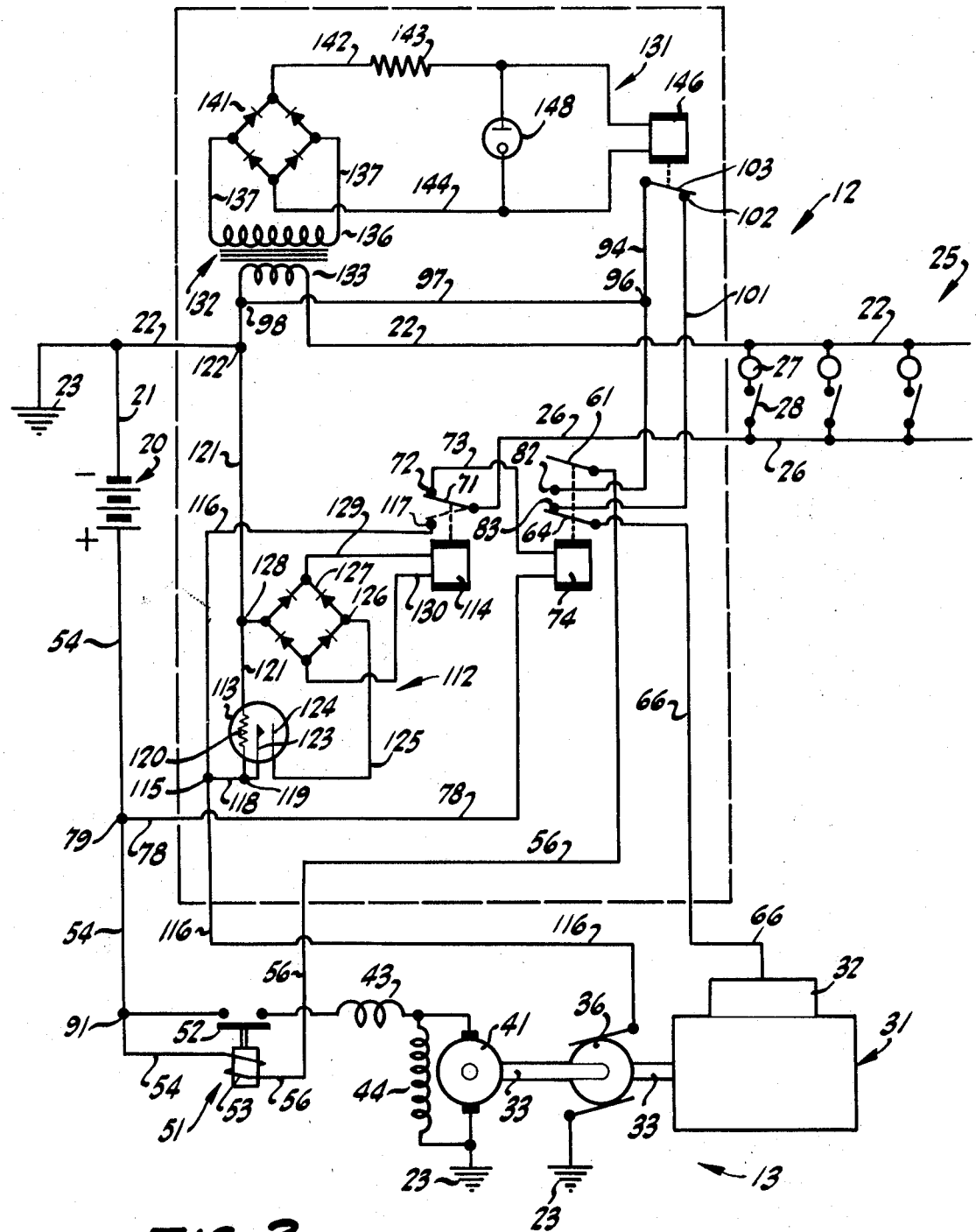

Other objects, together with the foregoing, are attained in the embodiment described in the following description and illustrated in the accompanying drawing in which:

FIG. 1 is a perspective view of the major components of a typical installation; and, FIG. 2 is a schematic wiring diagram of the system.

While the starter control of the invention is susceptible of numerous physical embodiments, depending upon the environment and requirements of use, substantial numbers of the herein shown and described embodiment have been made, used, tested and sold, and all have performed in an eminently satisfactory manner.

The control unit of the invention, generally designated by the reference numeral 12, is conveniently located adjacent a conventional engine-generator set 13 of the remote electric start-stop variety.

If desired, the engine-generator set 13 and the starting control unit 12 in close juxtaposition can be isolated by a sound-dampening enclosure, not shown, provision being made for fresh air delivery to the engine's air intake, cooling, and for venting the engine's exhaust.

The negative terminal of a 12 volt battery 20 is connected to a conductor 21 suitably grounded, as at 23. Also connected to ground 23 is a common bus 22 leading to the load 25. Connected across the bus 22 and the other load circuit wire 26, or common load conductor, is a plurality of conventional load members 27 each preferably provided with a switch 28.

The engine-generator set 13 comprises, in customary fashion, a prime mover, such as an internal combustion engine 31, the engine including a conventional ignition system having the usual magneto 32.

Operatively connected to the engine's crankshaft 33 is a 120-volt alternator 36, having one side leading to ground 23, and a generator 41 similarly grounded and provided with a series winding 43 and a shunt winding 44.

The series field 43 serves as a winding for starting the engine. The shunt winding 44, on the other hand, provides the field for the alternator 36.

Starting of the engine is effected, as is customary, by a cranking solenoid 51, the solenoid plunger switch 52 being actuated by a coil 53 attached at one end to a conductor 54 connected to the positive terminal of the battery 20 and at the other end to a conductor 56 leading to a switch 61 located within the control unit 12.

The switch 61 is ganged with a switch 64 connected to a conductor 66 leading out of the control unit 12 and extending to the usual breaker points in the magneto 32 and which, when grounded, serve to stop the engine.

The components are selected so that when a load 27 of at least 40 watts is applied across the common bus 22 and the load circuit 26, as by closing one or more of the load switches 28, the engine 31 is started.

Tracing the circuit, it can be seen that as the switch 28 is closed, the potential appearing on the bus 22 services the load 27 and thence passes through the line 26 to a switch 71 normally or initially, engaging a contact 72. The contact 72 is connected to a line 73 leading to a first relay 74, thence through a wire 78 leading interiorly of the control unit 12 and connected at the junction 79 to the battery cable conductor 54 attached to the plus side of the battery 20.

The effect, therefore, of putting at least a 40 watt load on the line is to create a current flow through the winding of the first relay 74.

The effect of energizing the first relay 74 is to transfer the position of the ganged switches 61 and 64 downwardly from the positions shown. More specifically, as the switch 61 is depressed it comes into engagement with a contact 82, and the switch 64 is concurrently moved away from a contact 83 into an open circuit condition.

As the switch 61 engages the contact 82, current flows from the battery 20, through the battery cable conductor 54 and through the starting solenoid coil 53. From the coil 53, flow continues through the conductor 56 and inwardly into the control unit 12 and to the switch 61. Since the switch 61 has been swung into engagement with the contact 82, the current moves from the contact 82 through a conductor 94 to a junction 96 with a line 97 attached at 98 to the grounded bus 22.

By thus completing the circuit through the coil 53, the solenoid plunger switch 52 is closed, allowing current from the battery 20 to flow from the battery cable junction 91, through the switch 52 and through the starter winding 43, thence through the generator 41 to ground 23.

The generator 41, in other words, is made to act as a starting motor, rotating the shaft 33 and starting the engine 31.

Concurrently, as explained above, the switch 64, having been opened away from the contact 83, no longer completes the magneto to ground circuit. The magneto to ground circuit originates at the breaker points of the magneto 32, passes through the conductor 66 interiorly of the control unit 12, through the switch 64 and the contact 83, and thence through a line 101 leading to a contact 102 normally or initially engaged by a switch 103 connected by the line 94 to the junction 96, and thence through the conductor 97, joining the grounded bus 22 at the junction 98.

Initially, as stated above, the breaker points of the magneto 32 were grounded, thereby rendering the engine 31 inoperative; but, by opening the switch 64, as explained, the engine ignition is capable of firing and of starting up the engnie as the generator 41 is operated as a starting motor.

As the engine speed builds up, the voltage of the alternator 36 increases to full power preferably 120 volts, 60 cycles per second.

Approximately two seconds after full alternator power is attained, a time delay circuit 112 comes into operation. The timer member 113 of the circuit 112 is conveniently of the variety catalogued as "Amperex" 115 NO 2T and the relay member 114 of the circuit 112, is preferably of the heavy duty type having the ability to handle 25 amperes at 120 volts, such as a PR 7 DY, 6000 ohms.

The purpose of the time-delay relay circuit 112 is to direct the output from the alternator 36 into the load circuit 26 shortly after the time the alternator has come up to full output, a two seconds delay having been found to be very suitable.

As can be seen, the output current from the alternator 36 passes through a conductor 116, or power line, a portion of the output current being diverted at junction 115 and allowed to flow through the line 118, thence through a junction 119 and through a heater element 120 in the member 113, thence onwardly through the conductor 121 to join the grounded bus 22 at the junction 122.

The resistive heater element 120, after a two second heating period, deflects the bi-metallic strip 123 against the strip contact 124, thus completing the time delay circuit.

Engagement between the strips 123 and 124, in other words, completes the path from the junction 119, through a conductor 125 and to a junction 126 on one side of a silicon rectifier (Mallory FW 100) 127. The other side of the rectifier 127 is connected at junction 128 to the line 121 extending to the grounded bus 22. Attached to the other two junctions of the rectifier 127 are conductors 129 and 130 connected to the second relay 114.

It can therefore be seen, that as the current from the alternator 36 builds up, the time delay circuit soon effects operation of the relay 114.

The purpose of the rectifier 127 is to eliminate chatter of the relay 114 after the engine 31 is turned off and the alternator, in slowing down, continues to feed current into the power line 116 but at an increasingly slower frequency, as the alternator is coming to rest. By converting the slow A.C. into pulsing D.C. by means of the rectifier, in other words, chattering of the relay 114 does not occur at output frequencies from 60 down to 0 cycles per second. As the alternator comes to rest, as will subsequently be explained, the switch 71 returns from the position shown in outline to the initial attitude, shown in full line in FIG. 2.

When the time delay circuit 112 is closed and the relay 114 is energized, the switch 71 is pulled away from the contact 72 and is urged into engagement with the contact 117, as indicated in outline. Current from the alternator 36 thereupon flows, and continues to flow, through the power line 116, through the contact 117 and the switch 71, thence to the load circuit 26 and to service at the load 27.

Full alternator voltage is thereby applied to the line and to the demands of the load.

Concurrently, as the relay 114 depresses the switch 71 away from the contact 72 the circuit including the first relay 74 is opened and the relay 74 is de-energized. The effect of this is to return the ganged switches 61 and 64 to their upper initial positions, as shown. This, in turn, opens the cranking solenoid circuit 53 and the starting motor switch 52.

Upward movement of the ganged switches 61 and 64 also closes the switch 64 against the contact 83 thereby closing the magneto to ground circuit comprising the conductor 66 and the line 101 extending to contact 102 and through the switch 103 and the conductor 94 to the junction 96, thence through the conductor 97 to junction 98 and to the grounded bus 22.

As explained above, grounding of the magneto 32 for any appreciable length of time will stop the engine.

Consequently, I have provided a secondary or overriding circuit 131 for opening the magneto to ground circuit within milliseconds after the switch 64 is biased into engagement with the contact 83.

Included in the circuit 131 is a step-up transformer 132 including a primary winding 133, disposed in series in the common bus 22, and a secondary winding 136 having its ends connected to a pair of leads 137 extending to a selenium rectifier 141, of 150 milliamperes capacity. The voltage step-up from the primary 133 to the secondary winding 136 is on the order of 1 to 35.

The remaining two junctions of the rectifier 141 are connected respectively, to a conductor 142 including a line or dropping resistor 143 (2000 ohms, 5 watts) and to a conductor 144. The conductors 142 and 144 are connected in turn, to a relay 146 (for example, a Potter and Bloomfield 5000 ohm plate relay type) operatively associated with the switch 103; and shunted across the conductors 142 and 144 is a suitable voltage regulating member 148, such as an RCA OA2 serving to regulate the voltage across the relay 146 and prevents it from exceeding 70 volts despite voltage fluctuations of 30 to 150 volts in the secondary winding 136.

As can now readily be seen, when the time delay relay 114 goes into effect, and the full alternator voltage is applied through the power line 116 to the load, a reaction resulting from the imposition of the load causes a small voltage drop to occur across the primary winding 133. This is reflected in a stepped-up A.C. voltage in the secondary 136, this being rectified to D.C. in the rectifier 141. This D.C. voltage is impressed upon the relay 146, causing the switch 103 to open and thereby preventing the magneto circuit from grounding. This occurs, as stated, within milliseconds after the switch 64 is return-biased to its initial position in engagement with the contact 83, and therefore the engine is not slowed down to any significant extent.

The values of the dropping resistor 143 and the voltage regulator are selected so that a current of approximately 6 to 8 milliamperes is maintained in the relay 146 despite the wide fluctuations, as stated above, in voltage on the secondary 136.

The engine automatically stops when the load 25 is decreased below a predetermined amount.

Assume, for example, that all of the load switches 28 are opened.

In this situation, there is no longer any voltage drop across the primary winding 133, therefore none is induced in the secondary winding 136. With no current in the over-riding circuit 131, the relay 146 is de-energized, allowing the switch 103 to return to engagement with the contact 102. This completes the magneto to ground circuit and stops the engine. The inertia of the engine-generator set 13 continues for a short time to rotate the alternator 36, which in turn, continues to generate current. As the frequency slows to a small number of alternations per second, any tendency for the feed switch 114 to chatter is entirely eliminated, as explained above, by the rectifier circuit 127. As motion ceases, the switch 71 opens.

As will be appreciated, the foregoing system can readily be adapted to 3 wire, 220 volt service, merely by the addition of appropriate switches and conductors in a manner well known to those who are acquainted in the art.

It can therefore be seen that I have provided a compact, efficient control unit which is not only versatile, but is also quiet and stable in operation.

What is claimed is:

1. An automatic starting and stopping control for an engine-generator set having a battery, said control comprising:
   (a) a grounded common bus line connected to one terminal of the battery;
   (b) a common load conductor connected to the other terminal of the battery to provide a common load conductor to battery circuit;
   (c) a load member across said bus and said load conductor;
   (d) a first relay member interposed in said load conductor energized as said load member is serviced by the battery;
   (e) an engine starting circuit connected to the battery and to the engine-generator set, said engine starting circuit including starter motor windings;
   (f) first switching means interposed in said engine starting circuit and actuated by said first relay member for concurrently energizing the starter motor windings and opening the magneto to ground circuit as said first relay member is energized;
   (g) a power line connecting the power terminal of the generator to said common load conductor;
   (h) a second switch located between said power line and said common load conductor and interposed in said common load conductor to battery circuit;
   (i) a thermally responsive time delay circuit connected to said power line, said time delay circuit including a time delay member and a second relay member capable of actuating said second switch as said time delay member becomes operative to close said time delay circuit and energize said second relay member, actuation of said second switch being concurrently effective to open said common load conductor to battery circuit and to close said power line to common load conductor circuit, the opening of said common load conductor to battery circuit de-energizing said first relay member thereby allowing said first switching means to close the magneto to ground circuit and de-energize the starter motor windings;
   (j) a transformer-connected over-riding circuit including a transformer energized by the power from the generator, a rectifier, and a third relay; and
   (k) a third switch actuated by said third relay, said third switch being connected to said first switching means and to said common bus line, said third switch being effective to open the magneto to ground circuit as said third relay is energized.

2. An automatic control as in claim 1 including a voltage regulator in said over-riding circuit for governing the amount of current in said third relay.

3. An automatic control as in claim 1 including a second rectifier interposed in said time delay circuit and connected to said second relay member, the pulsating direct current output of said second rectifier being effective to maintain said second relay member and said second switch in actuated condition at alternator output frequencies at least between 1 and 60 cycles per second.

4. An automatic control as in claim 1 wherein the step up ratio between the primary winding and the secondary winding is on the order of 1 to 35 and wherein said secondary winding is connected to said rectifier in said over-riding circuit.

5. An automatic control as in claim 1 wherein said load member includes a switch for selectively engaging and disengaging said load member from said common bus and said common load conductor.

References Cited

UNITED STATES PATENTS

| | | | |
|---|---|---|---|
| 2,477,714 | 8/1949 | Baer | 290—30 |
| 2,579,130 | 12/1951 | Swam | 290—30 |
| 2,810,079 | 10/1957 | McFarland | 290—30 |

ORIS L. RADER, Primary Examiner

W. E. DUNCANSON, JR., Assistant Examiner